(12) United States Patent
Amar

(10) Patent No.: US 9,915,067 B2
(45) Date of Patent: *Mar. 13, 2018

(54) REINFORCED BOARD AND METHOD OF PRODUCING THEREOF

(71) Applicant: Dany Amar, Ramat Hasharon (IL)

(72) Inventor: Dany Amar, Ramat Hasharon (IL)

(73) Assignees: Dany Amar, Ramat Hasharon (IL); Naim Shichrur, Be'Er Yakov (IL); Assaf Shahar, Ramat Ishai (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,219

(22) Filed: Jan. 11, 2016

(65) Prior Publication Data

US 2016/0362891 A1 Dec. 15, 2016

Related U.S. Application Data

(63) Continuation of application No. 14/501,394, filed on Sep. 30, 2014, now Pat. No. 9,260,868, which is a
(Continued)

(51) Int. Cl.
| | |
|---|---|
| *E04C 2/00* | (2006.01) |
| *E04C 2/06* | (2006.01) |
| *B32B 13/04* | (2006.01) |
| *B32B 13/08* | (2006.01) |
| *B32B 3/26* | (2006.01) |
| *B32B 3/30* | (2006.01) |
| *E04C 2/04* | (2006.01) |
| *E04B 2/00* | (2006.01) |

(Continued)

(52) U.S. Cl.
CPC ............ *E04C 2/06* (2013.01); *B32B 3/266* (2013.01); *B32B 3/30* (2013.01); *B32B 13/04* (2013.01); *B32B 13/08* (2013.01); *E04C 2/043* (2013.01); *E04C 2/3405* (2013.01); *E04C 2/46* (2013.01); *E04F 13/0866* (2013.01); *B32B 2451/00* (2013.01); *B32B 2607/00* (2013.01)

(58) Field of Classification Search
CPC .................................................. E04F 13/0866
USPC ...................... 52/796.1, 582.1, 578, 586.1
See application file for complete search history.

(56) References Cited

U.S. PATENT DOCUMENTS

| 3,465,487 A | 9/1969 | Coste et al. |
| 4,112,647 A | 9/1978 | Scheid |
(Continued)

FOREIGN PATENT DOCUMENTS

JP        7113278      5/1995

OTHER PUBLICATIONS

International Search Report and Written Opinion for PCT/IB2011/055516, dated Sep. 27, 2012, 9 pages.
(Continued)

*Primary Examiner* — Joshua J Michener
*Assistant Examiner* — Keith Minter
(74) *Attorney, Agent, or Firm* — Shichrur & Co.

(57) ABSTRACT

Reinforced boards and/or walls, and methods of producing thereof. In some non-limiting examples, there is provided a reinforced gypsum board and a process for the production thereof. In one example, the reinforced board may include one or more reinforcing elements, e.g., to enhance the rigidity of the board and/or to provide support for the board.

17 Claims, 20 Drawing Sheets

Related U.S. Application Data continuation of application No. 14/091,642, filed on Nov. 27, 2013, now Pat. No. 8,869,495, which is a continuation of application No. 13/313,047, filed on Dec. 7, 2011, now Pat. No. 8,601,769.

(60) Provisional application No. 61/420,364, filed on Dec. 7, 2010.

(51) Int. Cl.
*E04F 13/08* (2006.01)
*E04C 2/34* (2006.01)

(56) References Cited

U.S. PATENT DOCUMENTS

| | | | |
|---|---|---|---|
| 4,255,910 A | 3/1981 | Wendt | |
| 4,443,988 A | 4/1984 | Coutu, Sr. | |
| 4,897,976 A | 2/1990 | Williams et al. | |
| 5,187,910 A | 2/1993 | Nicholas et al. | |
| 5,617,686 A | 4/1997 | Gallagher, Jr. | |
| 5,644,883 A | 7/1997 | Menchetti | |
| 5,740,644 A | 4/1998 | Menchetti | |
| 5,950,389 A | 9/1999 | Porter | |
| 6,202,377 B1 | 3/2001 | Krieger | |
| 6,314,704 B1 | 11/2001 | Bryant | |
| 6,408,594 B1 | 6/2002 | Porter | |
| 6,427,408 B1 | 8/2002 | Krieger | |
| 8,161,697 B1 | 4/2012 | McDonald | |
| 8,601,769 B2 * | 12/2013 | Amar | B32B 13/04 52/796.1 |
| 8,869,495 B2 * | 10/2014 | Amar | B32B 13/04 52/796.1 |
| 9,260,868 B2 * | 2/2016 | Amar | B32B 13/04 |
| 2002/0069600 A1 | 6/2002 | Bryant | |
| 2002/0170259 A1 | 11/2002 | Ferris | |
| 2003/0029108 A1 * | 2/2003 | Neuhaus, III | E04B 1/161 52/309.12 |
| 2006/0174577 A1 | 8/2006 | O'Neil | |
| 2007/0240374 A1 | 10/2007 | Bennett et al. | |

OTHER PUBLICATIONS

International Preliminary Report on Patentability for PCT/IB2011/055516, dated Jun. 20, 2013, 6 pages.

Office Action for U.S. Appl. No. 13/313,047, dated Jun. 20, 2012, 7 pages.

Office Action for U.S. Appl. No. 13/313,047, dated May 14, 2013, 14 pages.

Office Action for U.S. Appl. No. 14/501,394, dated Jun. 25, 2015, 5 pages.

Notice of Allowance for U.S. Appl. No. 14/501,394, dated Oct. 7, 2015, 14 pages.

* cited by examiner

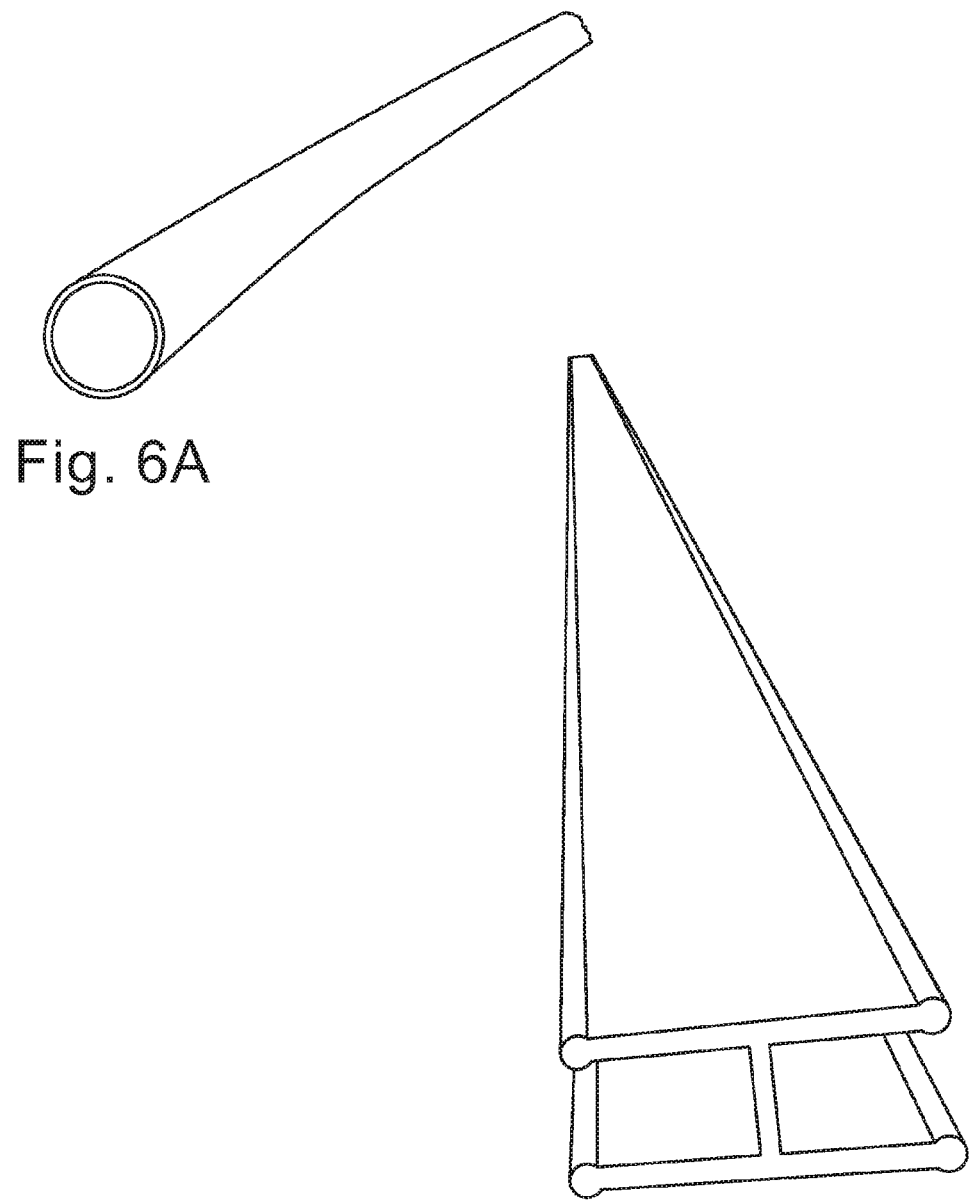
Fig. 6A
Fig. 6B
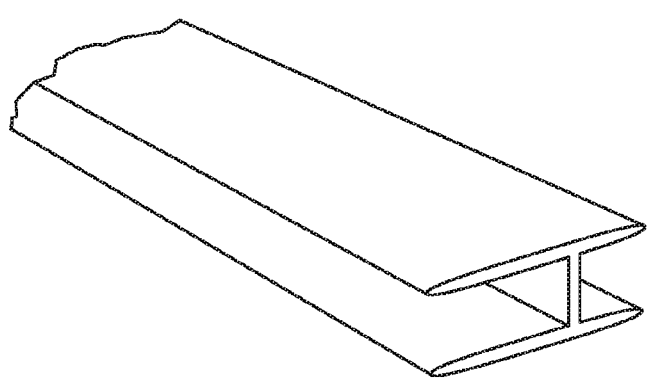
Fig. 6C

REINFORCED BOARD AND METHOD OF PRODUCING THEREOF

CROSS REFERENCE

This application is a Continuation Application of U.S. patent application Ser. No. 14/501,394, filed Sep. 30, 2014, which is a Continuation Application of U.S. patent application Ser. No. 14/091,642, filed Nov. 27, 2013, which is a Continuation Application of U.S. patent application Ser. No. 13/313,047, filed Dec. 7, 2011, which claims the benefit of and priority from U.S. Provisional Patent application 61/420,364, entitled "Reinforced Board and Method of Producing Thereof", filed Dec. 7, 2010, the entire disclosures of which are incorporated herein by reference.

BACKGROUND

The development of gypsum boards ("wallboards") began as early as 1917, but did not become popular for residential home use until after World War II. Before that time, wall construction was primarily lath, or wooden horizontal supports, covered in plaster. Plaster walls took a great deal of time to build, and professional application was usually necessary. Construction using gypsum board was much more efficient and did not require the specialized labor that plaster walls sometimes did.

Since the mid-1940s, construction using gypsum boards has been the primary wall construction in most houses. Vertical wooden pieces frame a room providing support for the sheets of wallboard. These sheets are connected to the framing by either screws or nails, and seamed together using a special drywall compound, which leaves an even and flat surface. The result is a wall that is smooth and easy to finish.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 6A-6I represent photographs of exemplary reinforcing elements, in accordance with some demonstrative embodiments.

DETAILED DESCRIPTION

Figure 1:
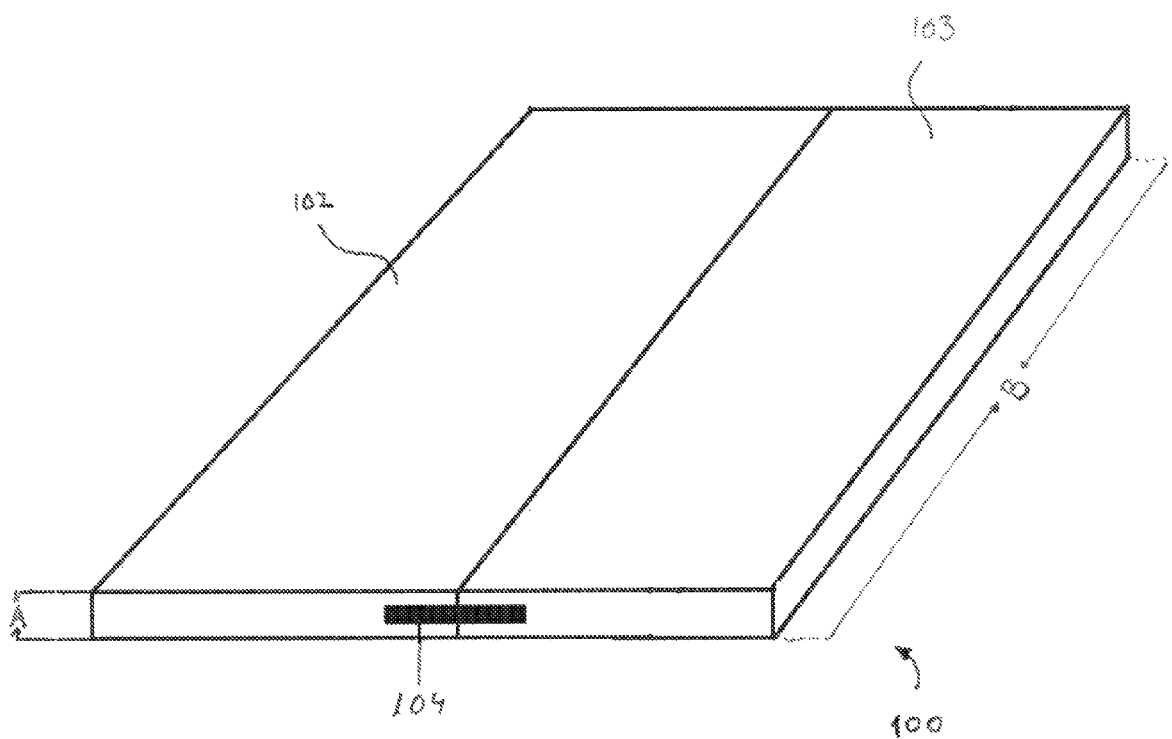
FIG. 1 is an isometric view of a wall, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In some demonstrative embodiments, there is provided a reinforced gypsum board and a process for the production thereof. According to some embodiments, the reinforced board may include one or more reinforcing elements, e.g., to enhance the rigidity of the board and/or to provide support for the board.

According to some demonstrative embodiments, there is provided a movable wall essentially capable of moving from a first location to a second location, for example, using one or more moving elements, e.g., as described below. In some demonstrative embodiments, the movable wall may at least partially include one or more reinforced boards as described herein in accordance with some embodiments.

The term "gypsum board" as used herein may refer to any suitable panel and/or board made, for example, of one or more gypsum plasters pressed between two or more sheets of paper, including, for example, a Drywall, a Wallboard, a Gyp Board, a Rock Lath, a Sheetrock, a green board, a blue board and the like.

Some of the following embodiments are described herein with reference to one or more gypsum boards and it will be appreciated that other embodiments may be implemented with respect to any other suitable board and/or panel, including, for example, one or more cement boards, e.g., cast cement boards, one or more wooden boards and the like, e.g., as described below.

The terms "plurality" and "a plurality" as used herein include, for example, "multiple" or "two or more". For example, "a plurality of items" includes two or more items.

According to some demonstrative embodiments, one or more reinforced gypsum boards may be used for any suitable construction and/or decoration purposes, including, for example, setting and/or building in-house walls, room construction, reinforcing existing walls, e.g., by positioning the one or more reinforced gypsum boards next to an existing wall, designing and constructing decorative elements and/or add-ons and the like.

According to other demonstrative embodiments, the one or more reinforced gypsum boards may be used for any suitable construction of furniture, including, for example, shelves, closets, chests, tables, desks, beds and the like.

According to some demonstrative embodiments, the one or more reinforcing elements described herein may include any suitable rigid and/or semi-rigid material capable of providing support and/or reinforcement to a gypsum board, including, for example, at least one of an aluminum, iron, steel, copper, one or more alloys, plastic, polyethylene (PET), polypropylene, wood, e.g., engineered wood such as a Medium-density fibreboard (MDF), chipboard, plywood, cast cement and the like.

According to other demonstrative embodiments, the one or more reinforcing elements described herein may refer to one or more segments and/or parts of the reinforced board configured to provide reinforcement to the reinforced board. For example, a cement board having a first thickness may include one or more segments having a second thickness, e.g., greater than the first thickness, to provide reinforcement to the cement board.

In some demonstrative embodiments, the one or more reinforcing elements may be added to the gypsum board at one or more suitable locations, e.g., to provide reinforcement to the gypsum board. According to some demonstrative embodiments, the suitable locations may include, for example, joints, corners, folding areas, areas in which two or more gypsum boards connect, areas which are prone to crack and/or break ("weak spots"), e.g., areas of the board which may be used for supporting a heavy load, and the like.

According to some demonstrative embodiments, the reinforcing elements may include any suitable shape and/or formation to enable the reinforcement of the gypsum board, including, for example, the shape of a circle, square, cross, T shape, H shape, linear shape, zigzag shape and the like, e.g., as described below with reference to FIGS. 6A-6I.

In some demonstrative embodiments, the one or more reinforcing elements may include a shape configured to enable the passage of materials, for example, a reinforcing element may have the shape of a tube, e.g., a hollow metal tube. According to some embodiments, the reinforcing elements may be used for transferring and/or conveying materials, including for example, cables, e.g., electrical cables, communication cables etc., plumbing tubes, e.g., water tubes, sewage tubes etc., air, e.g., air discharged from an air conditioner, wires and the like.

According to some demonstrative embodiments, the reinforcing elements may be attached and/or adhered to the gypsum board in any suitable manner, including, for example, by gluing, nailing, screwing, pasting, sticking, fastening and the like.

According to some embodiments, the reinforcing elements may be adhered to the gypsum board using any suitable adhesive material, including for example, drying adhesives, for example, solvent based adhesives and/or polymer dispersion adhesives (also known as emulsion adhesives), e.g., white glue; contact adhesives, rubber cements and the like; polyvinyl acetate (PVAc) based adhesives, pressure sensitive adhesives (PSA), contact adhesives, e.g., polychloroprene (Neoprene); hot adhesives, (also known as hot melt adhesives), reactive adhesives, e.g., multi-part adhesives, one-part adhesives, ultraviolet (UV) light curing adhesives, [also known as light curing materials (LCM)], heat curing adhesives such as epoxies, urethanes, and/or polyimides, moisture curing adhesives such as cyanoacrylates and/or urethanes, natural adhesives (also referred to as bioadhesives), such as casein and/or animal glue; synthetic adhesives such as elastomers, thermoplastics, emulsions, and/or thermosets, e.g., epoxy, polyurethane, cyanoacrylate and/or acrylic polymers, and the like.

In some demonstrative embodiments, a first side of the gypsum board may be used as an outer external surface and a second side of the gypsum board may be used as an inner external surface. According to some demonstrative embodiments, the reinforcing elements may be added to the gypsum board on one or more external surfaces of the gypsum board, e.g., on the inner external surface, on the outer external surface or on both.

In some demonstrative embodiments, the one or more reinforcing elements may be pre-incorporated in a board, for example, in the process of manufacturing the board. For example, a cast cement board may be produced by casting cement essentially around one or more reinforcing elements, e.g., to yield a reinforced cement board having reinforcing elements positioned within the board. According to another example, a gypsum board may be produced by casting gypsum essentially around one or more reinforcing elements, e.g., to yield a reinforced gypsum board having reinforcing elements positioned within the board.

According to other demonstrative embodiments, the one or more reinforcing elements may be at least partially inserted into a board, e.g., as described in detail below with reference to FIG. 8.

In some demonstrative embodiments, inserting the one or more reinforcing elements into the board, e.g., a gypsum board, may include at least partially inserting the one or more reinforcing elements into at least part of the gypsum board, e.g., into at least part of the plaster pressed between the two or more sheets of paper of the gypsum board. For example, the reinforcing element may be inserted into the gypsum board on its entirety, e.g., not projected outwards of the gypsum boards and/or not externally visible. According to other embodiments, the inserted reinforcing element may be partially inserted into the gypsum board, e.g., having one or more parts of the reinforcing element projected outwards of the gypsum boards, e.g., externally visible.

In the foregoing figures and/or illustrations, certain measurements and/or values may be presented. It will be appreciated by persons skilled in the art that these values and/or measurements are exemplary and do not necessarily represent the actual size and/or measurements of one or more features or components of the board designed in accordance with the embodiments of the present application. In some demonstrative embodiments, the actual size and/or measurements of one or more features or components of the board designed in accordance with the embodiments of the present application may vary and/or be dependent upon different factors.

Reference is now made to FIG. 1, which schematically illustrates an isometric view of a wall 100, in accordance with some demonstrative embodiments.

As is known in the art, a gypsum wall may be constructed by adhering together two or more gypsum boards using at least one adhesive material, e.g., at least one of the adhesive materials described in detail above.

According to some embodiments, as demonstrated in FIG. 1, a gypsum board 102 may be longitudinally connected to a gypsum board 103 to construct wall 100.

In FIG. 1, "A" represents the thickness of gypsum boards 102 and/or 103. According to some embodiments, "A" may represent any suitable thickness for a gypsum board, for example, 12.5 millimeters (mm).

In FIG. 1, "B" represents the length of gypsum boards 102 and/or 103. According to some embodiments, "B" may represent any suitable length for a gypsum board, for example, 2,600 mm.

According to some embodiments, wall 100 may include at least one reinforcing element 104 to provide reinforcement and/or support to wall 100. According to some embodiments, element 104 may be inserted into wall 100, for example, at a connection area between board 102 and board 104, e.g., as demonstrated below in FIGS. 7A-7C.

In some demonstrative embodiments, element 104 may have a linear shape, for example, wherein at least a first part of element 104 is inserted into board 102 and/or at least a second part of element 104 is inserted into board 103.

According to some embodiments, element 104 may be at least partially inserted throughout the length of board 102 and/or 103. For example, element 104 may have a length lesser, greater or equal to B. For example, element 104 may have a length of 2,600 mm.

According to some embodiments, the thickness of element 104 may be lesser, greater or equal to "A". For example the thickness of element 104 may be 2 mm.

Figure 2:
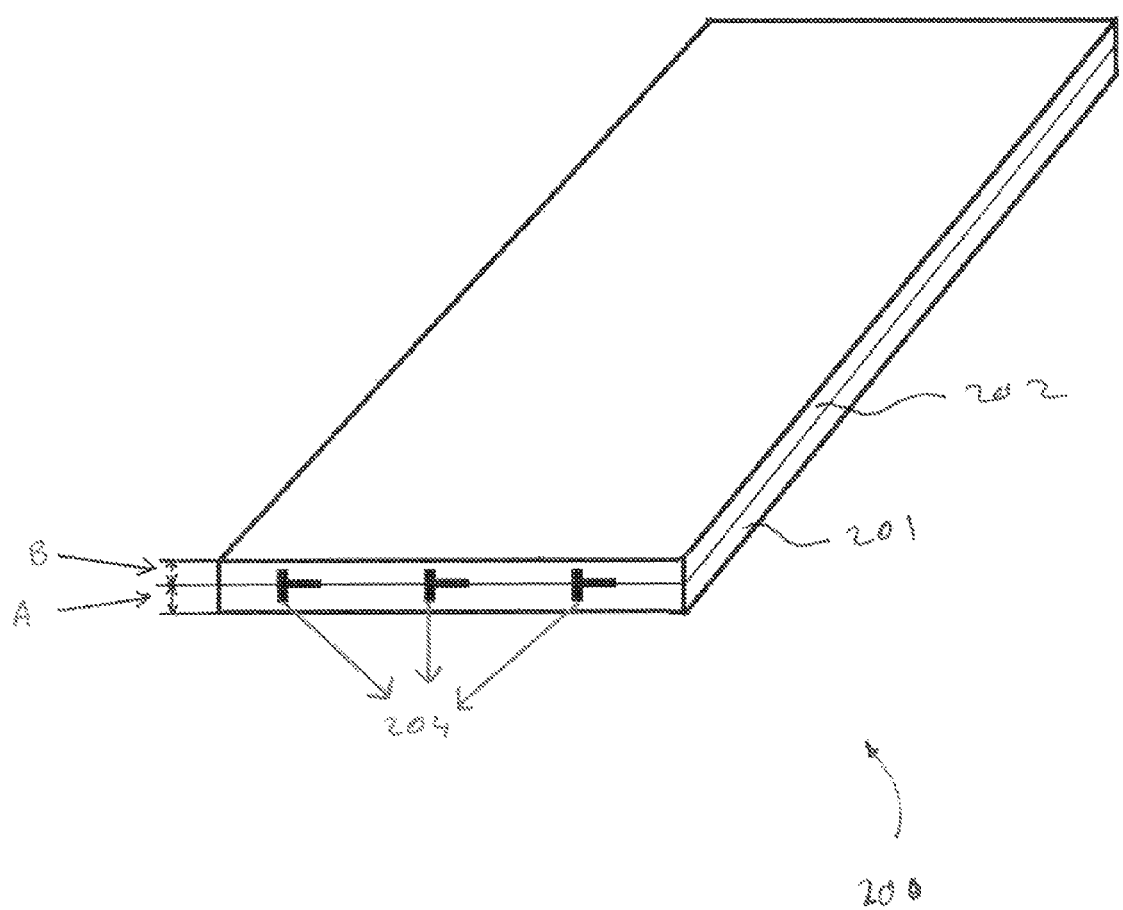
FIG. 2 schematically illustrates an isometric view of a wall, in accordance with some demonstrative embodiments.

Reference is now made to FIG. 2, which schematically illustrates an isometric view of a wall 200, in accordance with some demonstrative embodiments.

According to some embodiments, wall 200 may include one or more gypsum boards, for example, a gypsum board 201 and a gypsum board 202, e.g., adhered together.

In FIG. 2, "A" and "B" represent the thickness of gypsum boards 201 and 202, respectively. According to some embodiments, "A" and/or "B" may represent any suitable thickness for a gypsum board, for example, "A" and "B" may each represent a thickness of 12.5 mm. According to some embodiments, "A" and "B" may represent a thickness which may be lesser than the thickness known in the art for a gypsum board, for example, in order to avoid wall 100 being overly thick and/or heavy. For example, "A" may represent a thickness of 10 mm for gypsum board 201 and "B" may represent a thickness of 10 mm for gypsum board 202. According to this example, the overall thickness of wall 100 may be 20 mm.

According to some embodiments, wall 200 may include a plurality of reinforcing elements 204 to provide reinforcement and/or support to wall 200. According to some embodiments, elements 204 may be inserted into wall 200, for example, at a connection area between board 201 and board 202. According to some embodiments, when a plurality of elements 204 are inserted into wall 200, elements 204 may have a certain suitable spacing between each other, for example, a constant spacing, e.g., 10 to 12 centimeters (cm) apart.

In some demonstrative embodiments, elements 204 may have a T-shape, e.g., wherein at least a first part of the T-shape is inserted into board 201 and at least a second part of the T-shape is inserted into board 202.

According to some embodiments, boards 201 and 202 may be separate boards, e.g., placed and/or adhered one on top of the other, e.g., board 202 on top of board 201. According to other embodiments, boards 201 and 202 may represent different parts and/or portions of a single board, e.g., wall 200. For example, wall 200 may be folded in half, e.g., by connecting board 201 to board 202, e.g., as described in detail below with reference to FIGS. 9, 10A and 10B.

Figure 3:
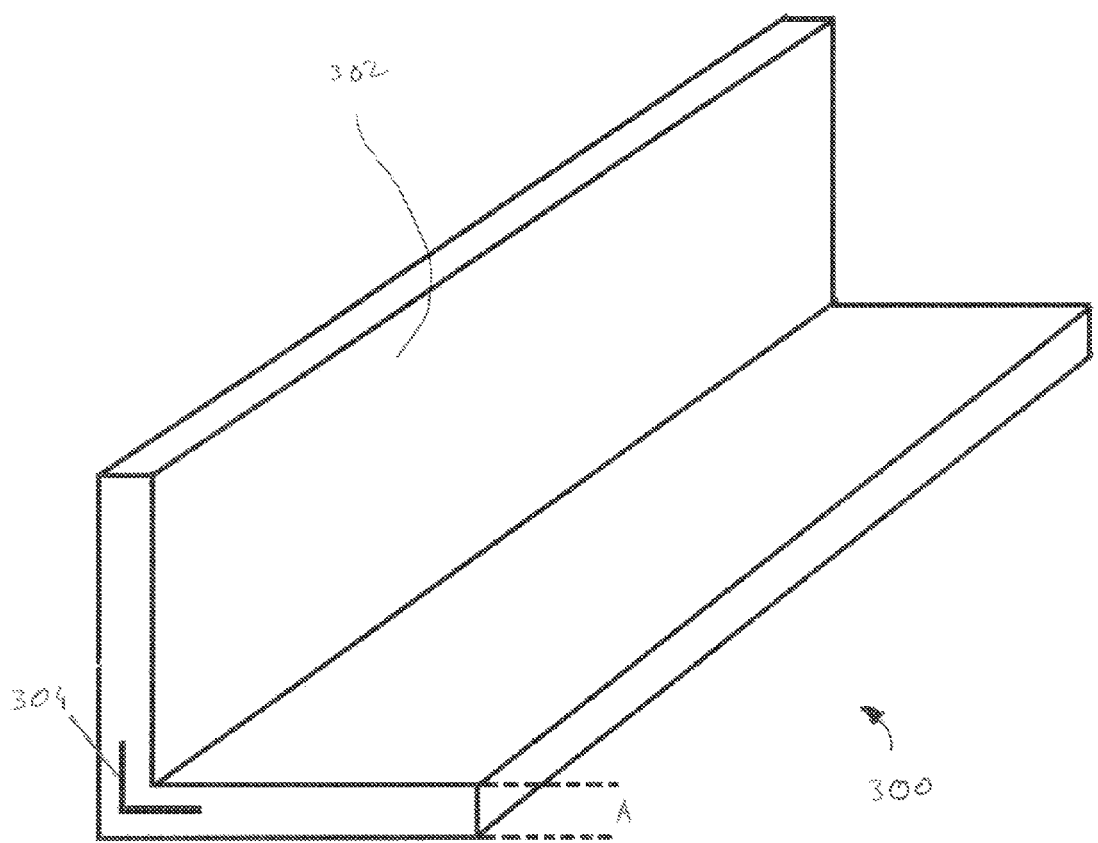
FIG. 3 schematically illustrates an isometric view of a wall, in accordance with some demonstrative embodiments.

Reference is now made to FIG. 3, which schematically illustrates an isometric view of a wall 300, in accordance with some demonstrative embodiments.

According to some embodiments, wall 300 may include one or more gypsum boards, for example, a gypsum board 302.

In FIG. 3, "A" represents the thickness of gypsum board 302. According to some embodiments, "A" may represent any suitable thickness for a gypsum board, for example, "A" may represent the thickness of 12.5 mm.

According to some embodiments, board 302 may be bent and/or folded at least once, e.g., as described below with reference to FIGS. 9, 10A and 10B, for example, to create at least one corner and/or joint.

According to some embodiments, wall 300 may include at least one reinforcing element 304 to provide reinforcement and/or support to wall 300. According to some embodiments, element 304 may be inserted into wall 300, for example, at the corner and/or joint area.

Figure 4:
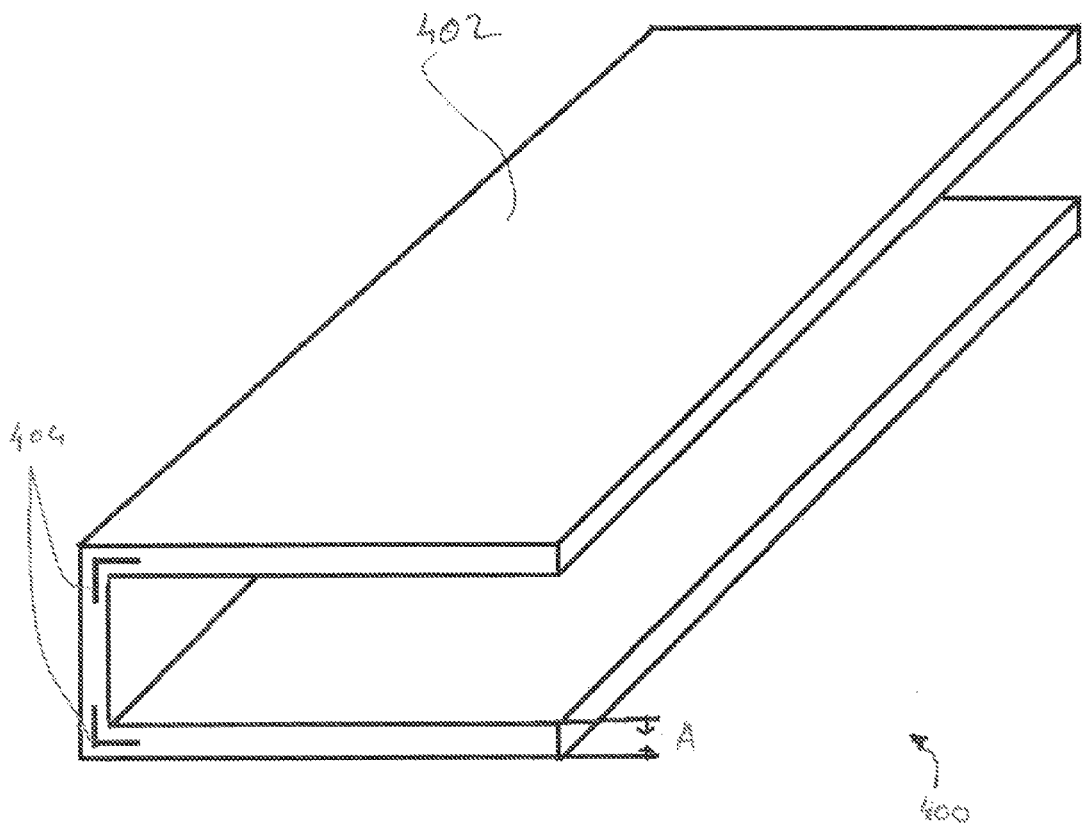
FIG. 4 schematically illustrates an isometric view of a wall, in accordance with some demonstrative embodiments.

Reference is now made to FIG. 4, which schematically illustrates an isometric view of a wall 400, in accordance with some demonstrative embodiments.

According to some embodiments, wall 400 may include one or more gypsum boards, for example, a gypsum board 402.

In FIG. 4, "A" represents the thickness of gypsum board 402. According to some embodiments, "A" may represent any suitable thickness for a gypsum board, for example, "A" may represent the thickness of 12.5 mm.

According to some embodiments, board 402 may be bent and/or folded twice, e.g., as described below with reference to FIGS. 9, 10A and 10B, for example, to create a wall segment having two corners.

According to some embodiments, wall 400 may include at least two reinforcing elements 404 to provide reinforcement and/or support to wall 400. According to some embodiments, elements 404 may be inserted into wall 400, for example, a first element of reinforcing elements 404 may be inserted at a first corner of wall 400 and a second element of reinforcing elements 404 may be inserted at a second corner of wall 400.

Figure 5A:
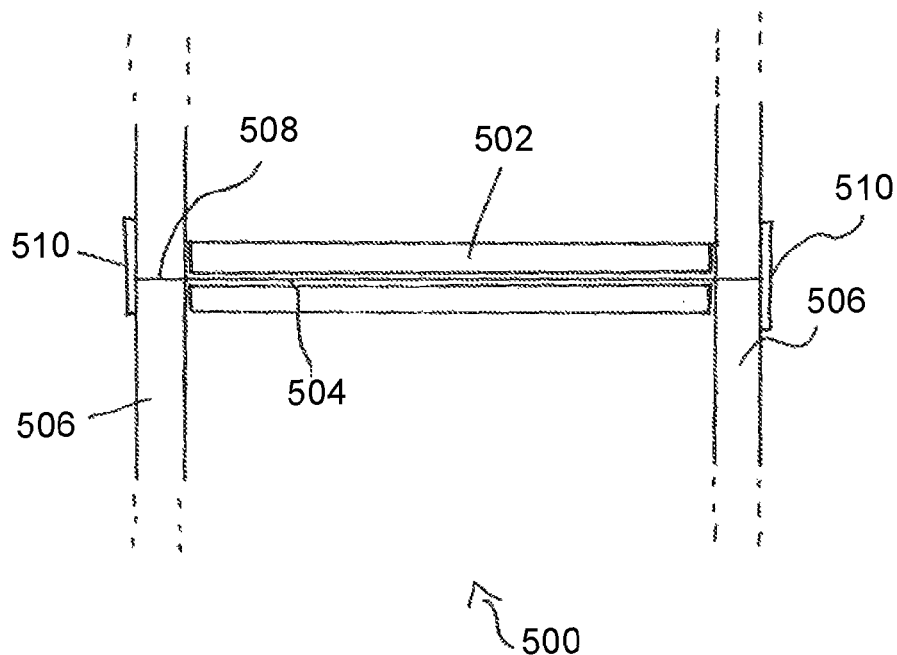
FIGS. 5A and 5B schematically illustrate a front-section view and isometric view of a construction, respectively, in accordance with some demonstrative embodiments.
Figure 5B:
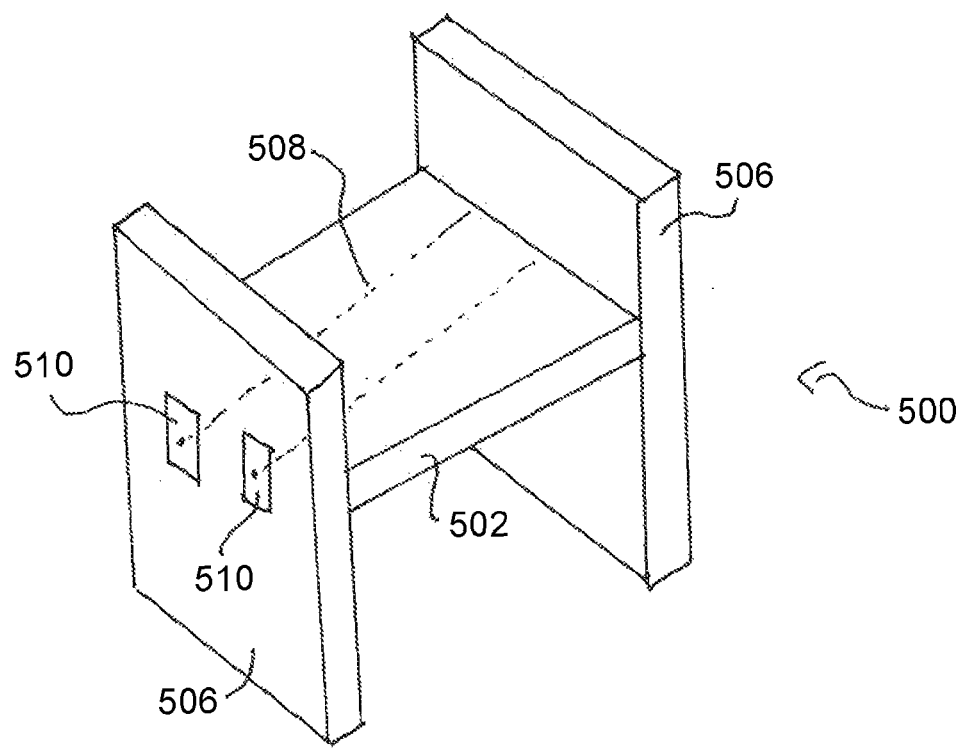

Reference is now made to FIGS. 5A and 5B, which schematically illustrate a front-section view and isometric view of construction 500, respectively, in accordance with some demonstrative embodiments.

In some demonstrative embodiments, as demonstrated in FIGS. 5A and 5B, construction 500 may include at least one board 502, e.g., a gypsum board. According to some embodiments, board 502 may perform the action of a shelf.

In some demonstrative embodiments, board 502 may be a board reinforced in accordance with some demonstrative embodiments described herein. For example, board 502 may include one or more reinforcing elements 504 (not shown in FIG. 5B), e.g., to enable board 502 to hold essentially heavy loads without bending and/or breaking.

In some demonstrative embodiments, as demonstrated in FIGS. 5A and 5B, construction 500 may include at least one side wall 506.

According to some demonstrative embodiments, board 502 may be connected to one or more side walls 506 via any suitable method, including, for example, gluing, sticking, screwing, nailing and the like.

According to other embodiments, board 502 may be connected to one or more side walls 506 via one or more reinforcing elements 504. For example, one or more reinforcing elements 504 may have a length greater than a length of board 502. According to this example, one or more parts of reinforcing elements 504 may project outwards from one or more sides of board 502, performing the action of attachment rods (also referred to herein as "bulges"). According to some embodiments, the bulges may be inserted into side walls 506, e.g., via designated holes created in advance in side walls 506.

In some demonstrative embodiments, the bulges may have sufficient length to be transferred through side walls 506 and be extended outwards of side walls 506. According to some embodiments, the bulges may be secured to side walls 506 using any suitable means, for example, by attaching metal plates to one or more edges of the bulges, e.g., to firmly secure the bulges in place.

According to some demonstrative embodiments, construction 500 may include one or more means for securely attaching board 502 to side walls 506. In some demonstrative embodiments, construction 500 may include at least one wire 508, e.g., to fixate board 502 to side walls 506.

According to some embodiments, wire 508 may include any suitable means for enabling the secure attachment of board 502 to side walls 506. For example, wire 508 may be a metal wire and/or string, a rope, a cable, a bar, e.g., a metal bar, a wooden bar and the like.

In some demonstrative embodiments, wire 508 may be transferred through board 502, for example, through reinforcing element 504, e.g., when reinforcing element 504 is in a shape of a tube. According to some embodiments, wire 508 may further be transferred through side walls 506, for example, via holes and/or tunnels prepared in side walls 506 in advance; and/or via one or more reinforcing elements 504 inserted into side walls 506.

In some demonstrative embodiments, wire 508 may be securely attached to side walls 506 via one or more fasteners 510. According to some embodiments, fasteners 510 may include any device capable of mechanically joining and/or affixing two or more objects together, e.g., wire 508 to one or more side walls 506.

According to some demonstrative embodiments, attaching board 502 to side walls 506 using wire 508 may enable board 502 to be essentially long, e.g., to have a length greater than 1 meter, e.g., 6 meters, and/or support essentially heavy loads.

Reference is now made to FIGS. 6A-6I which represent photographs of exemplary reinforcing elements, in accordance with some demonstrative embodiments.

In some demonstrative embodiments, FIG. 6A demonstrates a tubular reinforcing element in a shape of a circle.

In some demonstrative embodiments, FIGS. 6B and 6C demonstrate reinforcing elements having the shape of the letter "H" (also known as "H-shape").

Figure 6D:
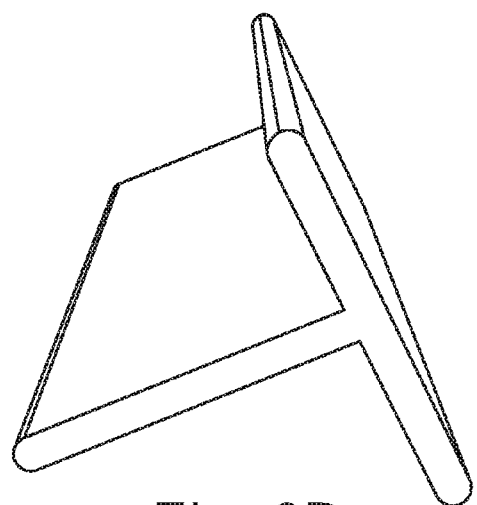

In some demonstrative embodiments, FIG. 6D demonstrates a reinforcing element having the shape of the letter "T" (also known as "T-shape").

Figure 6E:
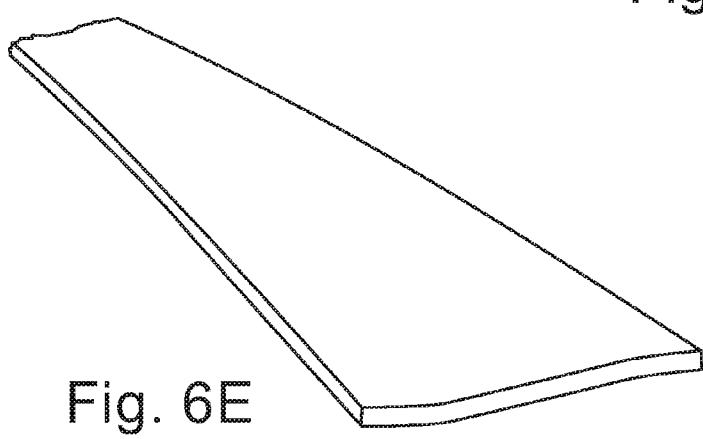
Figure 6F:
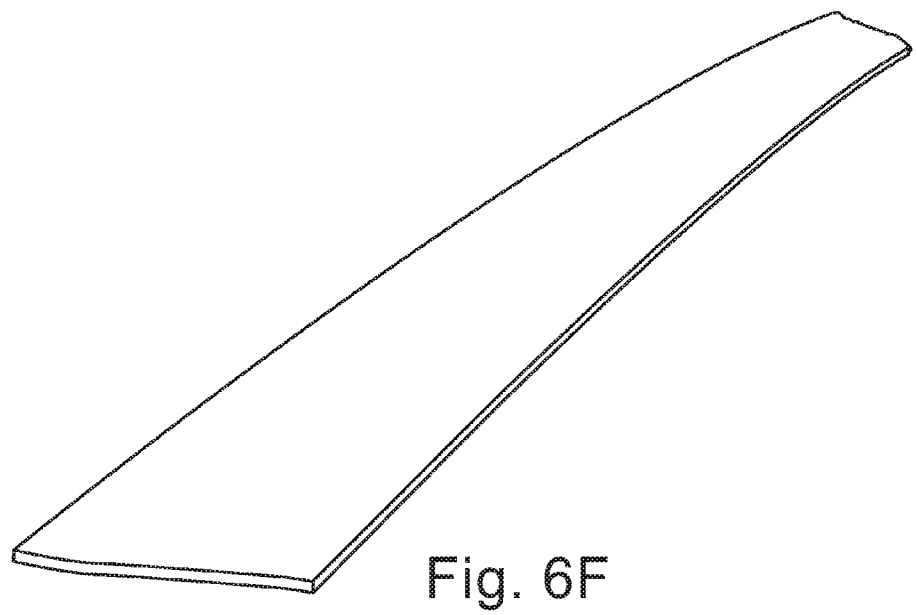

In some demonstrative embodiments, FIGS. 6E and 6F demonstrate reinforcing elements having a linear shape.

Figure 6G:
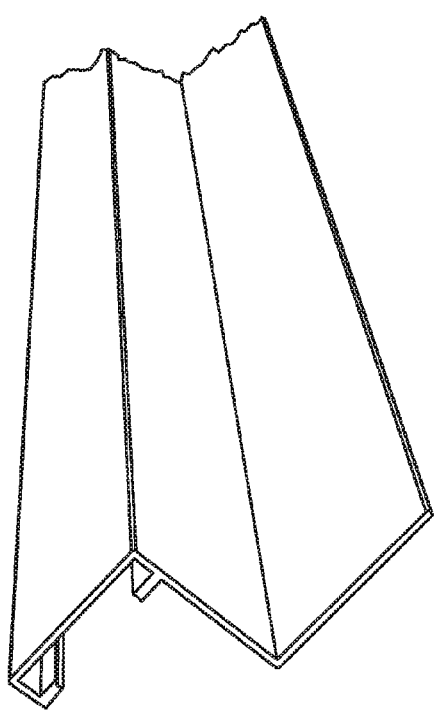

In some demonstrative embodiments, FIG. 6G demonstrates a reinforcing element having a Zigzag shape.

Figure 6H:
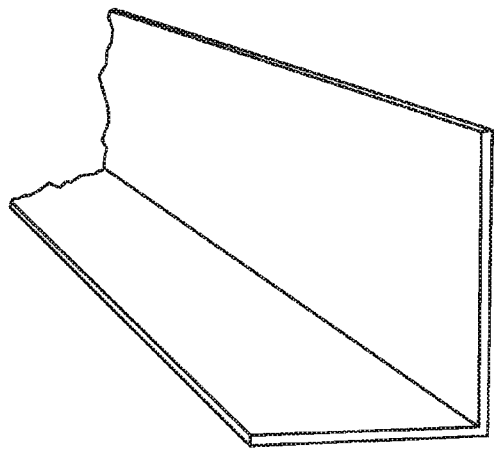
Figure 6I:
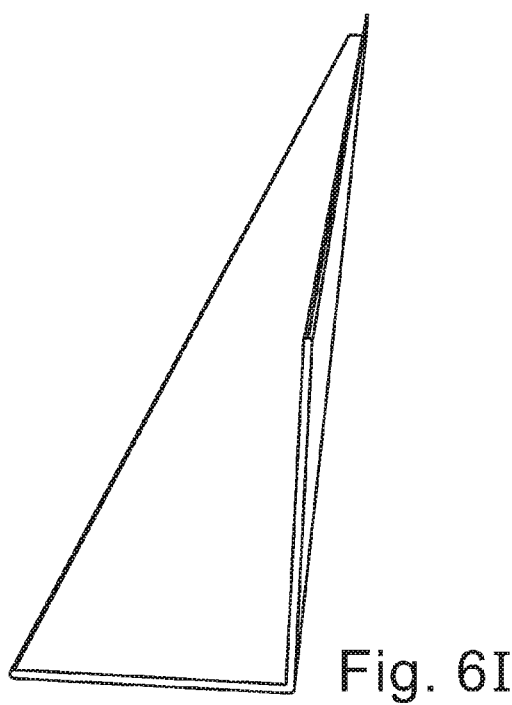

In some demonstrative embodiments, FIGS. 6H and 6I demonstrate reinforcing elements having the shape of the letter "L" (also known as "L-shape").

Figure 7A:
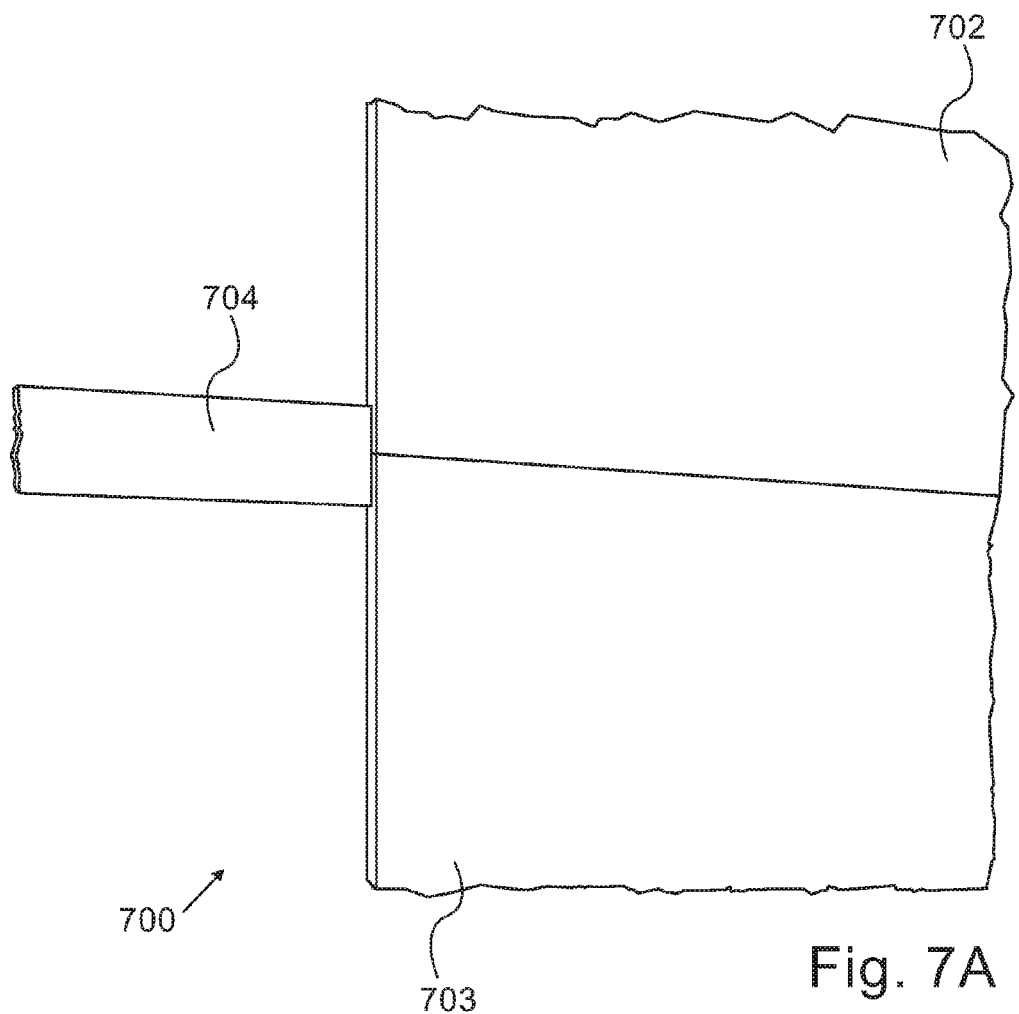
FIGS. 7A-7C are top plane view, side section view and isometric view photographs, respectively, of a gypsum wall, in accordance with some demonstrative embodiments.
Figure 7B:
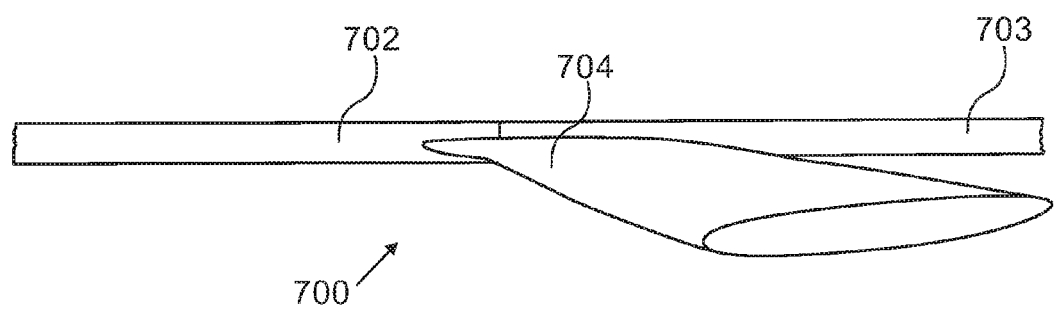
Figure 7C:
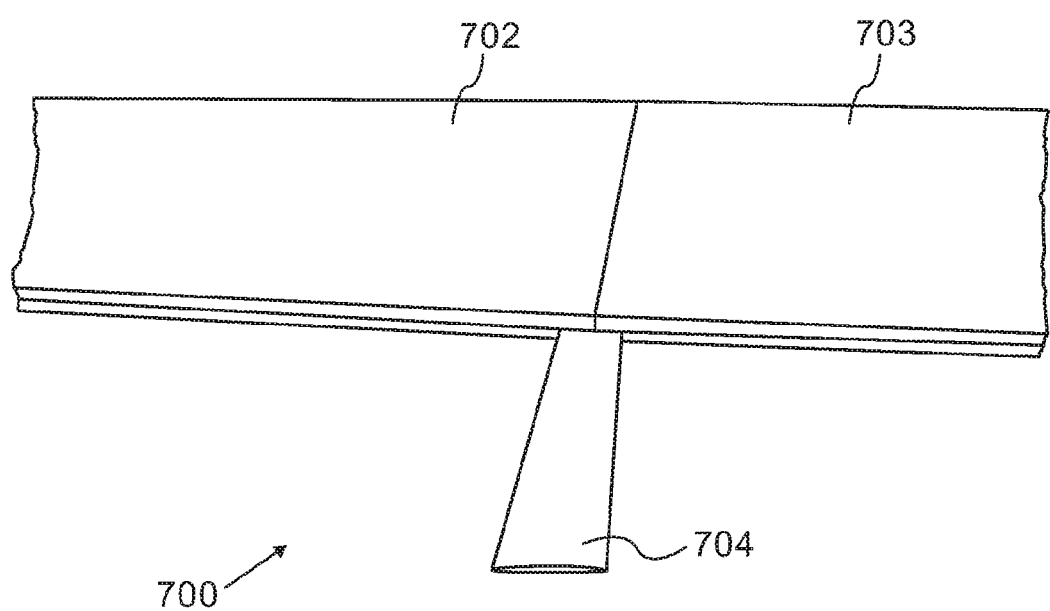

Reference is now made to FIGS. 7A-7C which are top plane view, side section view and isometric view photographs, respectively, of a gypsum wall 700, in accordance with some demonstrative embodiments.

As shown in FIGS. 7A-7C, gypsum wall 700 may include a gypsum board 702 longitudinally connected to gypsum board 703.

According to some embodiments, gypsum wall 700 may include at least one reinforcing element 704, e.g., to provide reinforcement to gypsum wall 700.

FIG. 7A demonstrates a top plane view of gypsum wall 700, in accordance with some demonstrative embodiments.

FIG. 7B demonstrates a side-section view of gypsum wall 700, in accordance with some demonstrative embodiments.

FIG. 7C demonstrates an isometric view of gypsum wall 700, in accordance with some demonstrative embodiments.

Figure 8:
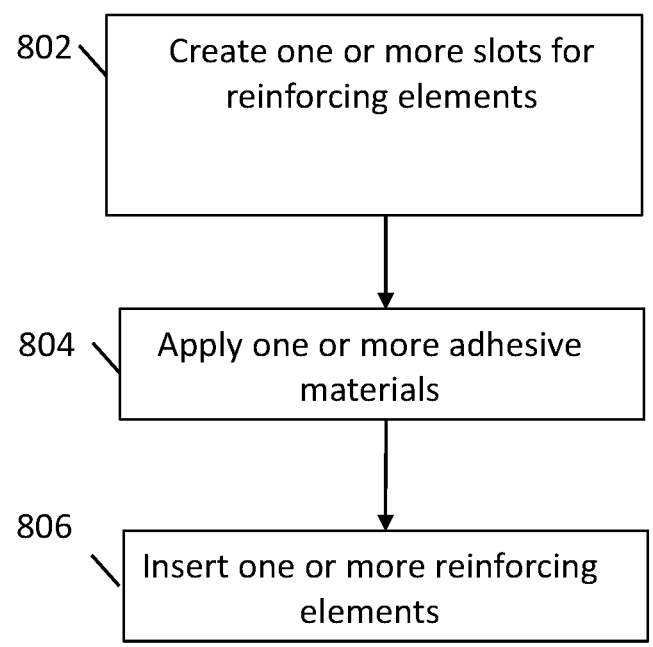
FIG. 8 schematically illustrates a block diagram of a method for reinforcing a board, in accordance with some demonstrative embodiments.

Reference is now made to FIG. 8, which schematically illustrates a block diagram of a method for reinforcing a board, in accordance with some demonstrative embodiments.

According to some demonstrative embodiments, as demonstrated at block 802, the method may include creating one or more slots in the board, e.g., a gypsum board, for reinforcing elements.

According to other embodiments, the method may include using one or more boards which include one or more slots, e.g., prepared in advance for inserting reinforcing elements. For example, in the process of manufacturing a gypsum board, one or more slots may be prepared for the purpose of inserting one or more reinforcing elements.

According to some embodiments, the slots may include any suitable crack, tunnel, hole and/or carving to enable at least partial positioning of one or more reinforcing elements therein.

According to some embodiments, the slots may be created using any method and/or machinery known in the art, including carving, e.g., manual carving, machine made carving and the like, drilling, cutting, cleaving and the like.

In some demonstrative embodiments, as demonstrated at block 804, the method may include applying one or more adhesive materials, e.g., one of the adhesive materials described in detail above.

In some demonstrative embodiments, as demonstrated at block 806, the method may include inserting at least a part of one or more reinforcing elements into the one or more created slots.

According to some demonstrative embodiments, the one or more reinforcing elements may be securely fixated to the board using any suitable means, for example, via nailing the one or more reinforcing elements to the board.

According to some demonstrative embodiments, the reinforcing elements may have a length greater than the length of the board. In some demonstrative embodiments, after the insertion of the reinforcing elements into the board, one or more parts of the reinforcing elements may project outwards of one or more sides of the board (also referred to herein as "excess parts" and/or "bulges").

According to some embodiments, the excess parts may be used for attaching the board to other boards, walls, items and the like, e.g., as demonstrated with reference to FIG. 5 above.

According to other embodiments, the excess parts may be cut, e.g., using a saw.

For example, the method may include creating tunnels for the insertion of a plurality of linear reinforcing elements into the gypsum board and applying glue therein. The method may further include inserting the plurality of linear reinforcing elements into the tunnel and cutting any excess parts of the reinforcing elements to provide a reinforced gypsum board.

Figure 9:
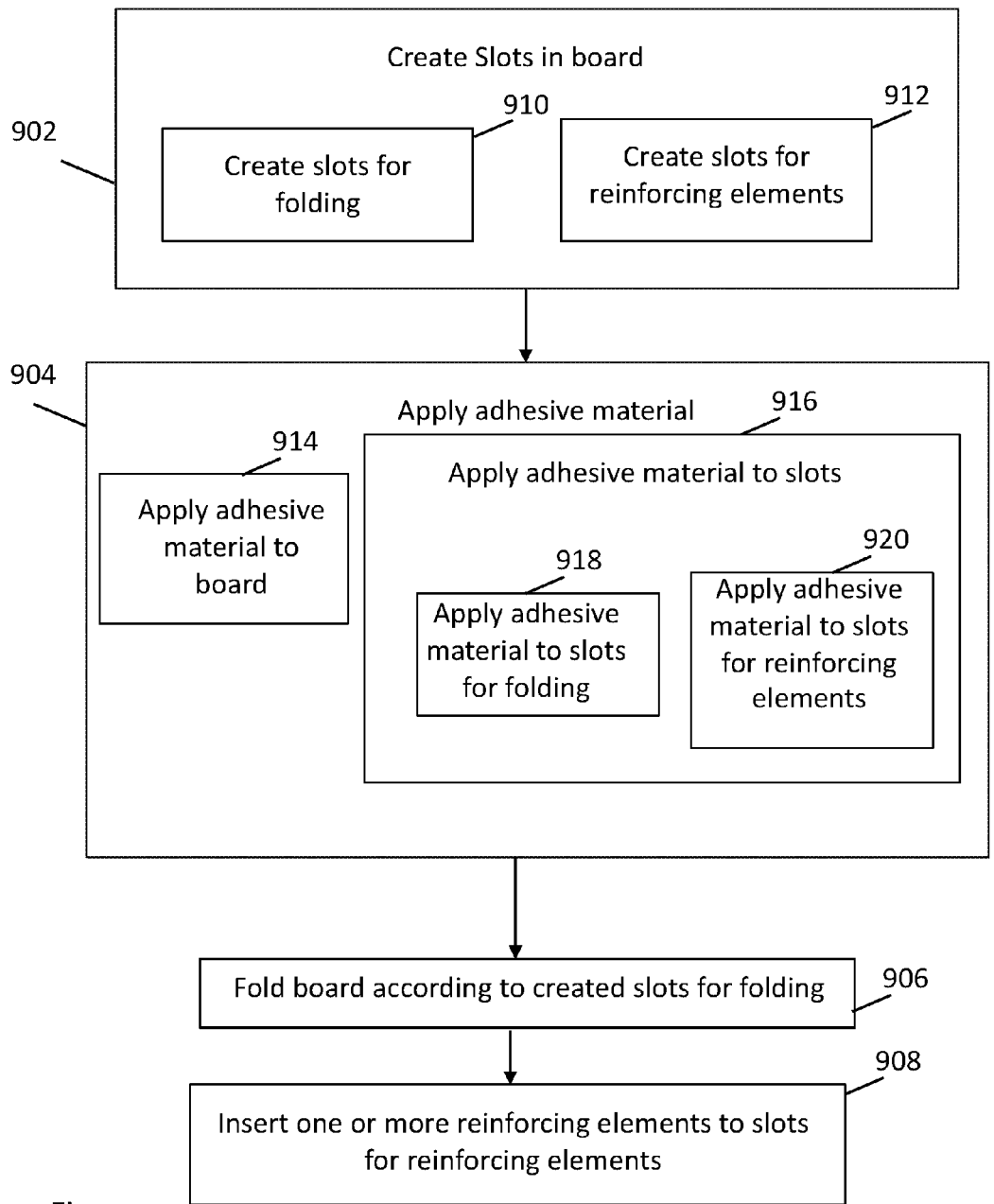
FIG. 9 schematically illustrates a block diagram of a method for folding and reinforcing a board, in accordance with some demonstrative embodiments.

Reference is now made to FIG. 9, which schematically illustrates a block diagram of a method for folding and reinforcing a board, in accordance with some demonstrative embodiments.

According to some demonstrative embodiments, as demonstrated at block 902, the method may include creating one or more slots in the board, e.g., a gypsum board.

According to some demonstrative embodiments, as demonstrated at block 910, creating the one or more slots in the board may include creating one or more slots for folding the board.

According to some demonstrative embodiments, the one or more slots for folding may be created at a suitable position and/or location to enable folding of the board. For example, one or more slots may be created essentially at the center of the board, e.g., to enable folding of the board in half, for example, as described with reference to FIGS. 10A and 10B.

In some demonstrative embodiments, the slots may include any suitable crack, tunnel, hole and/or carving to enable at least partial folding of the board.

Figure 11:
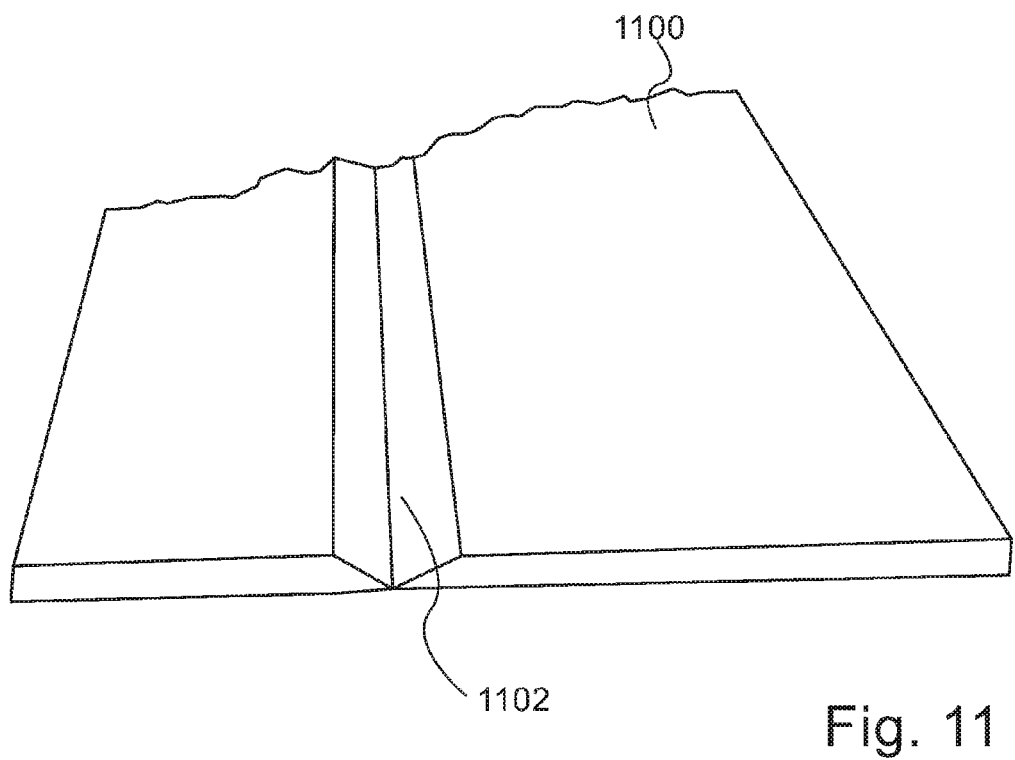
FIG. 11 represents a photograph of a slot created in a gypsum board, in accordance with some demonstrative embodiments.

According to some demonstrative embodiments, the one or more slots may have any suitable shape to enable the folding of the board, for example, a triangular shape, a linear shape and the like, e.g., as demonstrated in FIG. 11.

According to some embodiments, the slots may be created using any method and/or machinery known in the art, including carving, e.g., manual carving, machine made carving and the like, drilling, cutting, cleaving and the like, for example, as demonstrated in FIG. 11.

According to some demonstrative embodiments, as demonstrated at block 912, creating the one or more slots in the board may include creating one or more slots for reinforcing elements, e.g., as described below with reference to FIGS. 10A and 10B.

According to some embodiments, the slots may include any suitable crack, tunnel, hole and/or carving to enable at least partial positioning of one or more reinforcing elements therein.

According to some embodiments, the slots may be created using any method and/or machinery known in the art, including carving, e.g., manual carving, machine made carving and the like, drilling, cutting, cleaving and the like.

In some demonstrative embodiments, as demonstrated at block 904, the method may include applying one or more adhesive materials, e.g., one of the adhesive materials described in detail above.

In some demonstrative embodiments, as demonstrated at block 914, applying the one or more adhesive materials may include applying one or more adhesive materials to the board, for example, to enable the adhering of one or more parts of the board, e.g., upon folding of the board.

Figure 12:
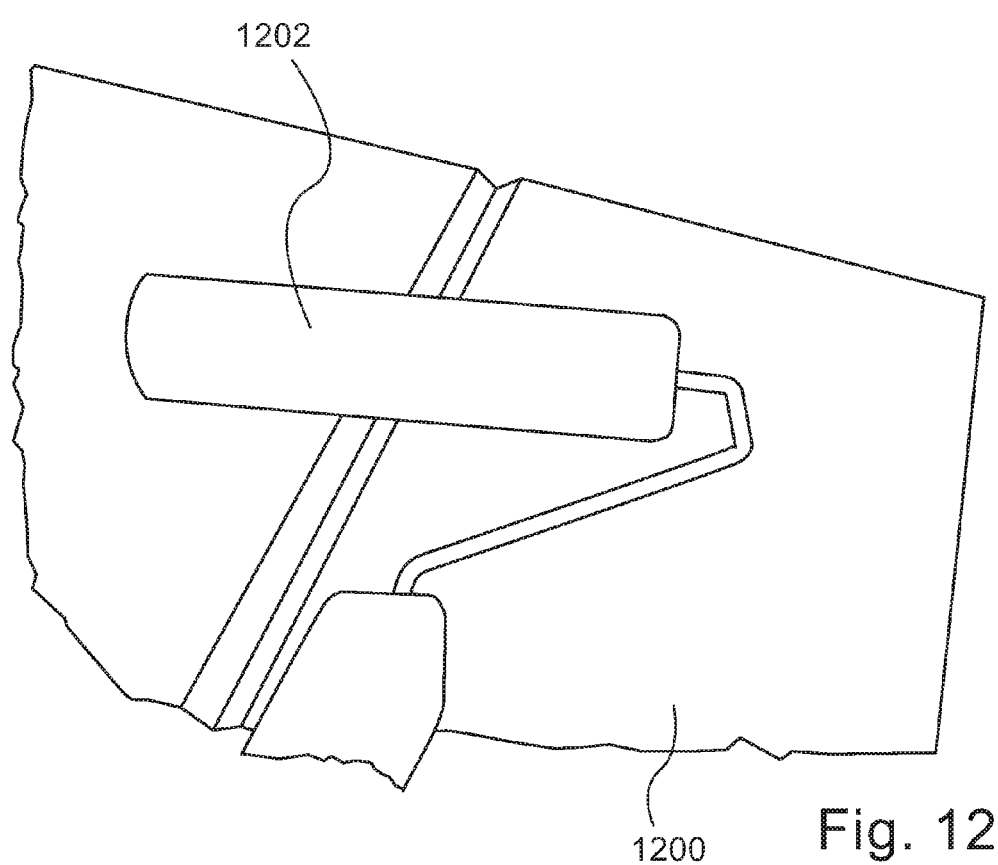
FIG. 12 represents a photograph of a process of applying an adhesive material to a gypsum board, in accordance with some demonstrative embodiments.

In some demonstrative embodiments, the adhesive material may be applied to the board using any suitable means, including for example, a glue gun, a brush, a roller and the like, e.g., as demonstrated in FIG. 12.

In some demonstrative embodiments, as demonstrated at block 916, applying the one or more adhesive materials may include applying one or more adhesive materials to the slots.

In some demonstrative embodiments, as demonstrated at block 918, applying one or more adhesive materials to the slots may include applying one or more adhesive materials to slots for folding, e.g., to enable firm adherence upon folding of the board.

In some demonstrative embodiments, as demonstrated at block 920, applying one or more adhesive materials to the slots may include applying one or more adhesive materials to one or more slots for reinforcing elements, e.g., to enable firm adherence of a reinforcing element to the board, e.g., essentially upon insertion of the reinforcing element into the board.

According to some demonstrative embodiments, the one or more reinforcing elements may be fixated to the board using any suitable means, for example, be nailing the one or more reinforcing elements to the board.

In some demonstrative embodiments, as demonstrated at block 906, the method may include folding the board according to the created slots for folding, e.g., as described with reference to FIGS. 10A and 10B.

According to some embodiments, the board may be folded once, e.g., folded in half, to create a wall constructed of two layers of boards.

According to other embodiments, the board may be folded more than once. For example, to construct different shapes and/or formations, e.g., for decoration purposes.

In some demonstrative embodiments and as is known in the art, a board, e.g., a gypsum board, may have a first side and a second side. According to some embodiments, the first side may be intended to be an external side ("outer side"), e.g., having a rough surface in comparison to the second side. The second side may be intended to be an internal side ("inner side"), e.g., having a smooth surface in comparison to the first side.

In some demonstrative embodiments, the board may be folded in any suitable manner which results in having the outer side externally visible and the inner side is concealed from external view (also referred to herein as "inward folding"). According to some embodiments, one or more slots for folding may be created on the inner side of the board, e.g., to enable the inward folding of the board.

In some demonstrative embodiments, the board may be folded in any suitable manner which results in having the inner side externally visible and the outer side is concealed from external view (also referred to herein as "outward folding"). According to some embodiments, one or more slots for folding may be created on the outer side of the board, e.g., to enable the outward folding of the board.

According to some demonstrative embodiments, the board may be folded two or more times to yield a decorative formation, e.g., by outward folding, e.g., as described with reference to FIG. 14. According to some embodiments, the decorative formation may be incorporated within an existing wall, e.g., as described with reference to FIG. 15. For example, the board may be folded a plurality of times to yield a box, e.g., to be vertically positioned within and/or onto an existing wall, for example, for decorative purposes, e.g., positioning a sculpture within the box and the like.

In some demonstrative embodiments, as demonstrated at block 908, the method may include inserting one or more reinforcing elements to one or more of the created slots for reinforcing elements, e.g., as described with reference to FIG. 16.

Figure 10A:
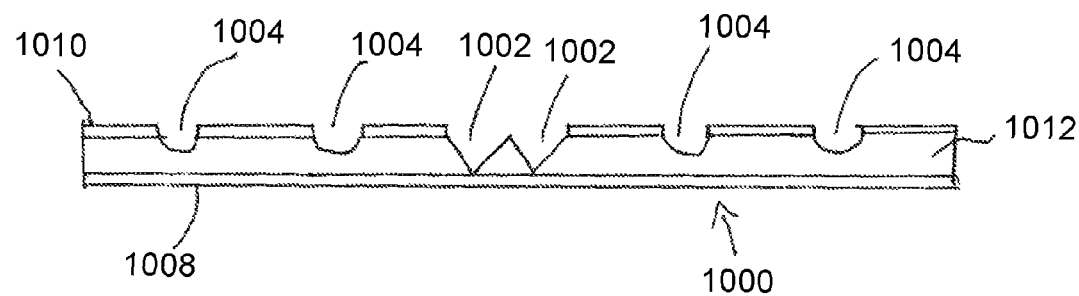
FIGS. 10A and 10B illustrate a side-section view of a board in a non-folded configuration and in a folded configuration, respectively, in accordance with some demonstrative embodiments.
Figure 10B:
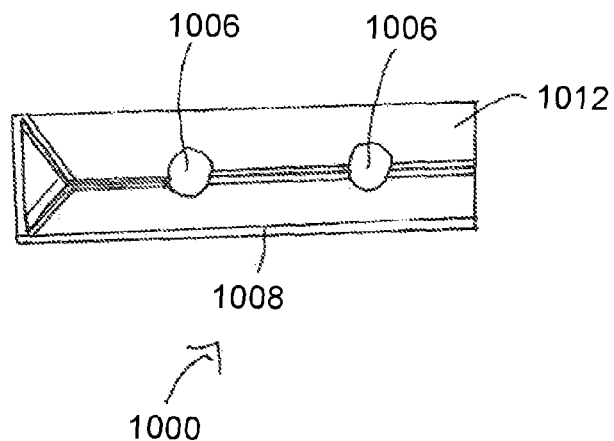

Reference is now made to FIGS. 10A and 10B, which illustrate a side-section view of a board 1000 in a non-folded configuration and in a folded configuration, respectively, in accordance with some demonstrative embodiments.

In some demonstrative embodiments, as shown in FIG. 10A, one or more slots may be created in board 1000. For example, slots 1002 may be created in board 1000 to enable the folding of board 1000, e.g., as described with reference to FIG. 11.

In some demonstrative embodiments, board 1000 may include a first paper sheet 1010 on a first side of the board, a second paper sheet 1008 on a second side of the board and one or more gypsum plasters 1012 pressed between sheets 1008 and 1010.

According to some embodiments, slots 1002 may be created by cutting through sheet 1010 and gypsum plaster 1012 without reaching sheet 1008. According to some embodiments, creating slots 1002 without reaching sheet 1008 may enable the folding of board 1000 while leaving sheet 1008 in tact (as demonstrated in FIG. 10B).

In some demonstrative embodiments, as shown in FIG. 10A, one or more slots 1004 may be created in board 1000 to enable the insertion of one or more reinforcing elements, for example, upon folding of board 1000, e.g., as demonstrated in FIG. 10B.

Reference is now made to FIG. 11, which represents a photograph of a slot 1102 created in a gypsum board 1100, in accordance with some demonstrative embodiments.

In some demonstrative embodiments, gypsum board 1100 may be folded or bent using slot 1102, e.g., as described in detail above.

Reference is now made to FIG. 12, which represents a photograph of a process of applying an adhesive material to a gypsum board 1200, in accordance with some demonstrative embodiments.

According to some demonstrative embodiments, the adhesive material may be applied using any suitable means, for example, using a roller 1202.

Figure 13:
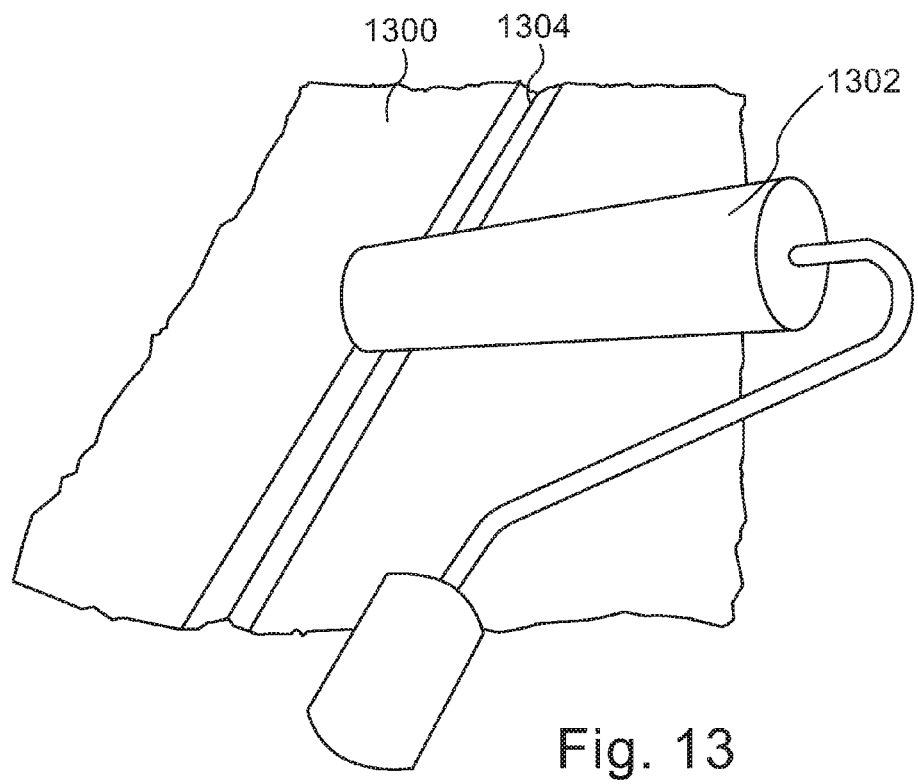
FIG. 13 represents a photograph of a process of applying an adhesive material to a slot for folding of a gypsum board, in accordance with some demonstrative embodiments.

Reference is now made to FIG. 13, which represents a photograph of a process of applying an adhesive material to a slot for folding 1304 of a gypsum board 1300, in accordance with some demonstrative embodiments.

According to some demonstrative embodiments, the adhesive material may be applied using any suitable means, for example, using a roller 1302.

Figure 14:
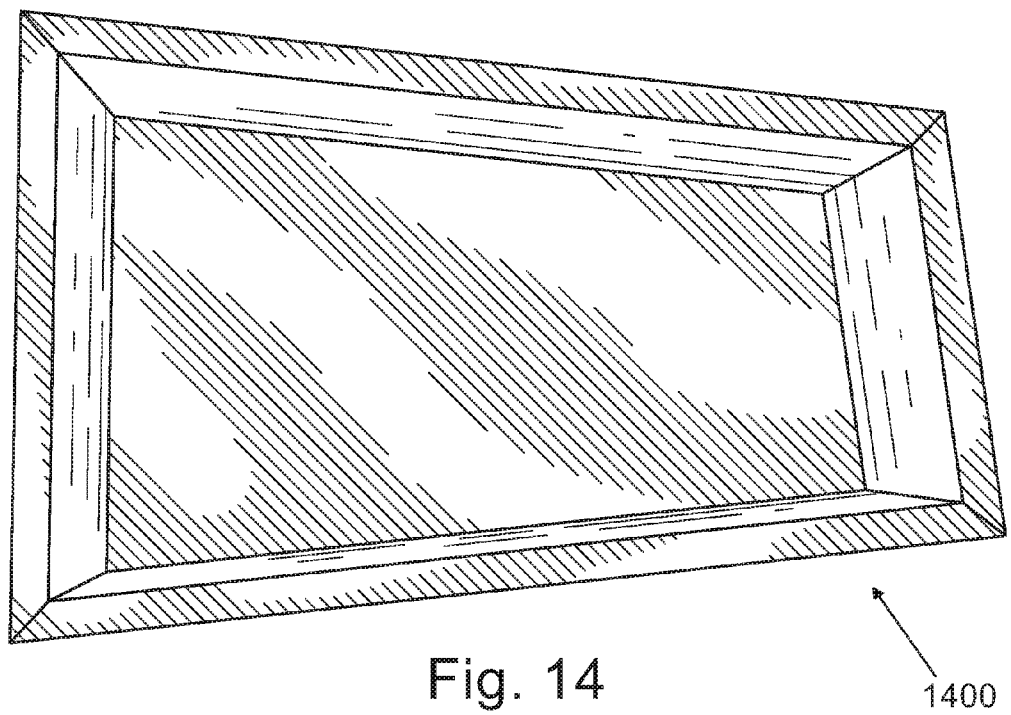
FIG. 14 represents a photograph of a construction, in accordance with some demonstrative embodiments.

Reference is now made to FIG. 14, which represents a photograph of a construction 1400, in accordance with some demonstrative embodiments.

According to some demonstrative embodiments, construction 1400 may be created via outward folding of one or more gypsum boards in accordance with some demonstrative embodiments described herein.

Figure 15:
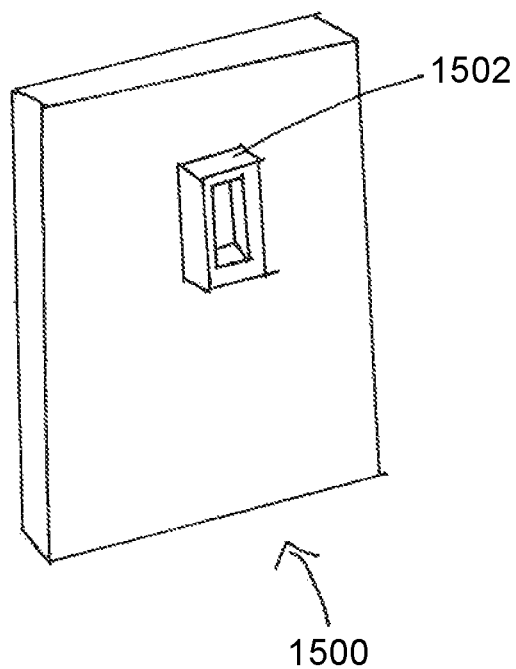
FIG. 15 schematically illustrates a wall, in accordance with some demonstrative embodiments.

Reference is now made to FIG. 15, which schematically illustrates a wall 1500, in accordance with some demonstrative embodiments.

In some demonstrative embodiments, wall 1500 may include one or more decorative constructions 1502.

In some demonstrative embodiments, decorative construction 1502 may be constructed by folding a gypsum board in accordance with some demonstrative embodiments described herein, e.g., via outward folding.

According to some demonstrative embodiments, decorative construction 1502 may be attached to wall 1500, e.g., in the case of decorating an existing wall.

According to other embodiments, decorative construction 1502 may be at least partially inserted into wall 1500. For example, a suitable segment may be taken out of wall 1500 to enable the at least partial insertion of decorative construction 1502 thereto.

Figure 16:
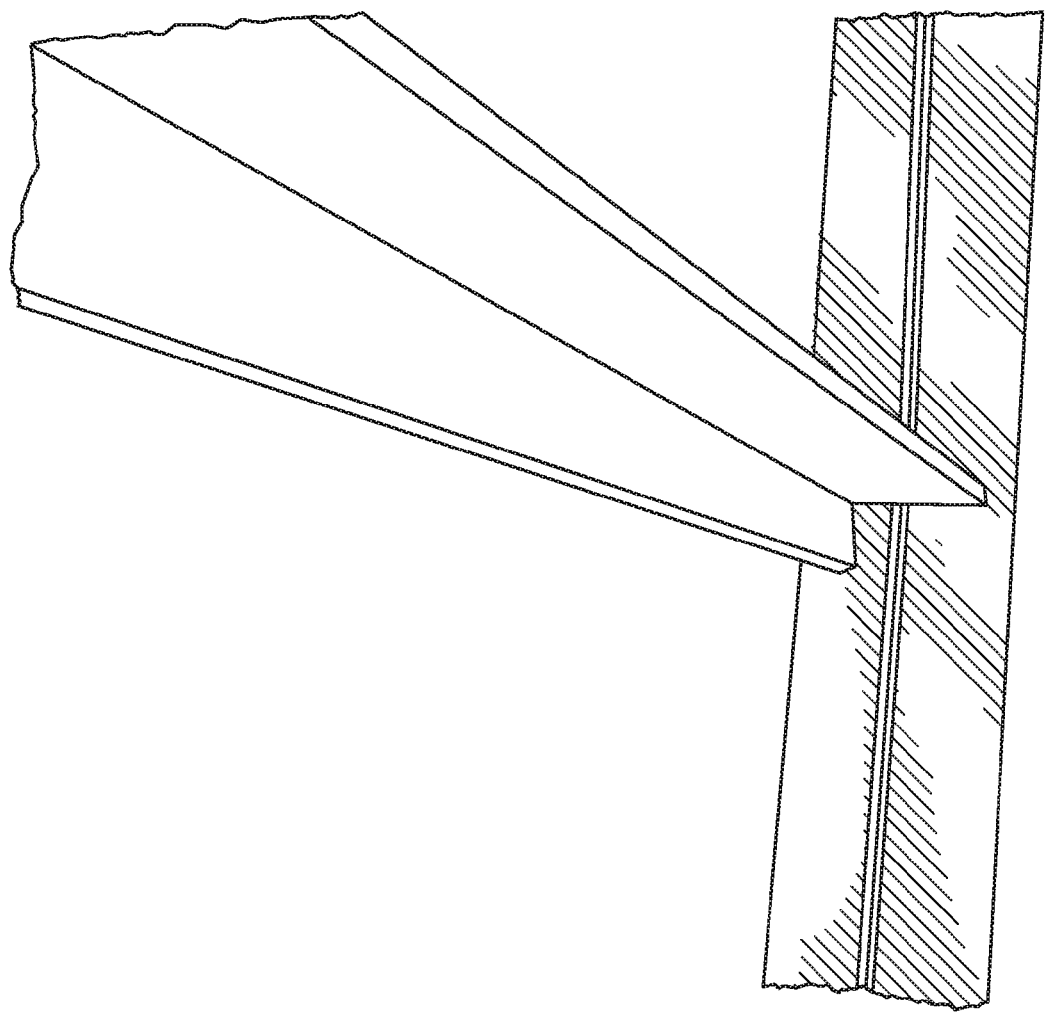
FIG. 16 represents a photograph of a process for the insertion of a reinforcing element into a gypsum wall, in accordance with some demonstrative embodiments.

Reference is now made to FIG. 16, which represents a photograph of a process for the insertion of a reinforcing element into a gypsum wall, in accordance with some demonstrative embodiments.

Figure 17:
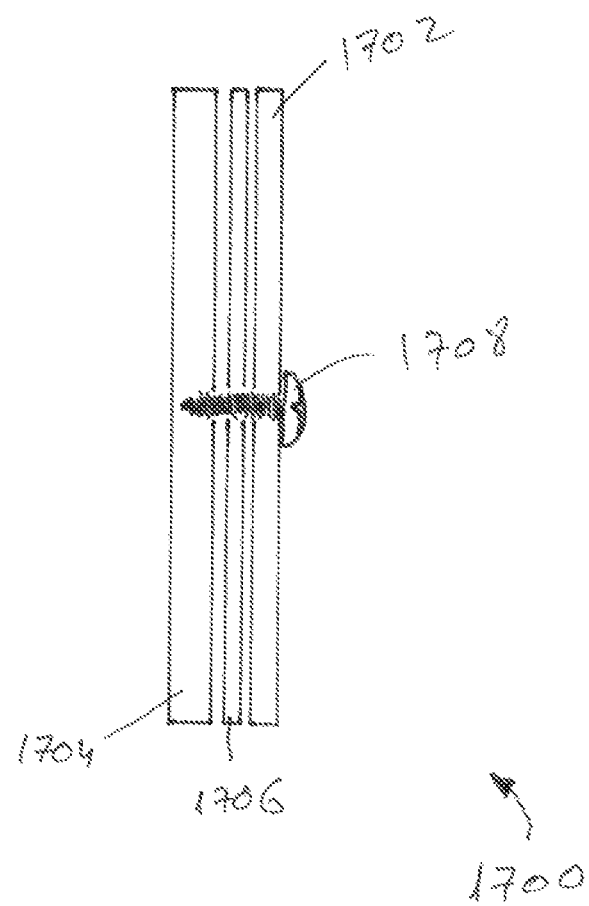
FIG. 17 schematically illustrates a wall, in accordance with some demonstrative embodiments.

Reference is now made to FIG. 17, which schematically illustrates a wall 1700, in accordance with some demonstrative embodiments.

In some demonstrative embodiments, wall 1700 may include one or more gypsum boards, e.g., a gypsum board 1702 and/or a gypsum board 1704.

According to some embodiments, wall 1700 may include at least one reinforcing element 1706, e.g., positioned between gypsum board 1702 and gypsum board 1704.

In some demonstrative embodiments, reinforcing element 1706 may include any suitable board, panel and/or a sheet made of any suitable rigid and/or semi-rigid material. For example, reinforcing element 1706 may be an aluminum sheet.

According to some embodiments, reinforcing element 1706 may be attached and/or adhered to gypsum board 1702 and/or gypsum board 1704 via any means described herein in accordance with some demonstrative embodiments.

In some demonstrative embodiments, a fastener 1708 may be inserted into wall 1700, e.g., in order to hang an item upon wall 1700. According to some embodiments, fastener 1708 may include any suitable bolt and/or screw known in the art.

According to some demonstrative embodiments, as demonstrated in FIG. 17, upon insertion of fastener 1708 into wall 1700, fastener 1708 may penetrate through reinforcing element 1706, e.g., enabling the secured positioning of fastener 1708 within wall 1700.

In some demonstrative embodiments, the secure positioning of fastener 1708 within wall 1700 may enable a user of fastener 1708 to hang items onto fastener 1708, for example, heavy items, e.g., televisions, pictures, shelves and the like.

In some demonstrative embodiments, there is provided a reinforced cement board and a process for the production thereof.

According to some demonstrative embodiments, cement boards may be exposed to outside weather conditions, e.g., direct sun, rain, snow etc., for example, when placed and/or positioned in outside places. As a result, deformation, bents and other changes in the structure of cement board are prone to occur.

In some demonstrative embodiments, a cement board may be reinforced in accordance with some demonstrative embodiments described herein, e.g., in order to prevent changes in the structure of the cement board.

Other embodiments may be implemented for reinforcing wooden boards and/or panels.

In some demonstrative embodiments there is provided a movable wall and a method.

According to some embodiments the movable wall may include any suitable board or panel, for example, a cement board, a gypsum board, e.g., a reinforced gypsum board, a wooden panel and the like.

In some demonstrative embodiments, the movable wall may be attached to an existing stationary wall, for example, in order to replace the existing wall, e.g., as described in detail below. For example, when an existing wall has one or more malformations and/or defects, e.g., cracks and/or mold, the movable wall may be moved to be positioned in front of the existing wall to cover the malformations.

In some demonstrative embodiments, the movable wall and/or the stationary wall may include one or more connecting elements, for example, to enable the connection of the movable wall to the stationary wall.

Figure 18:
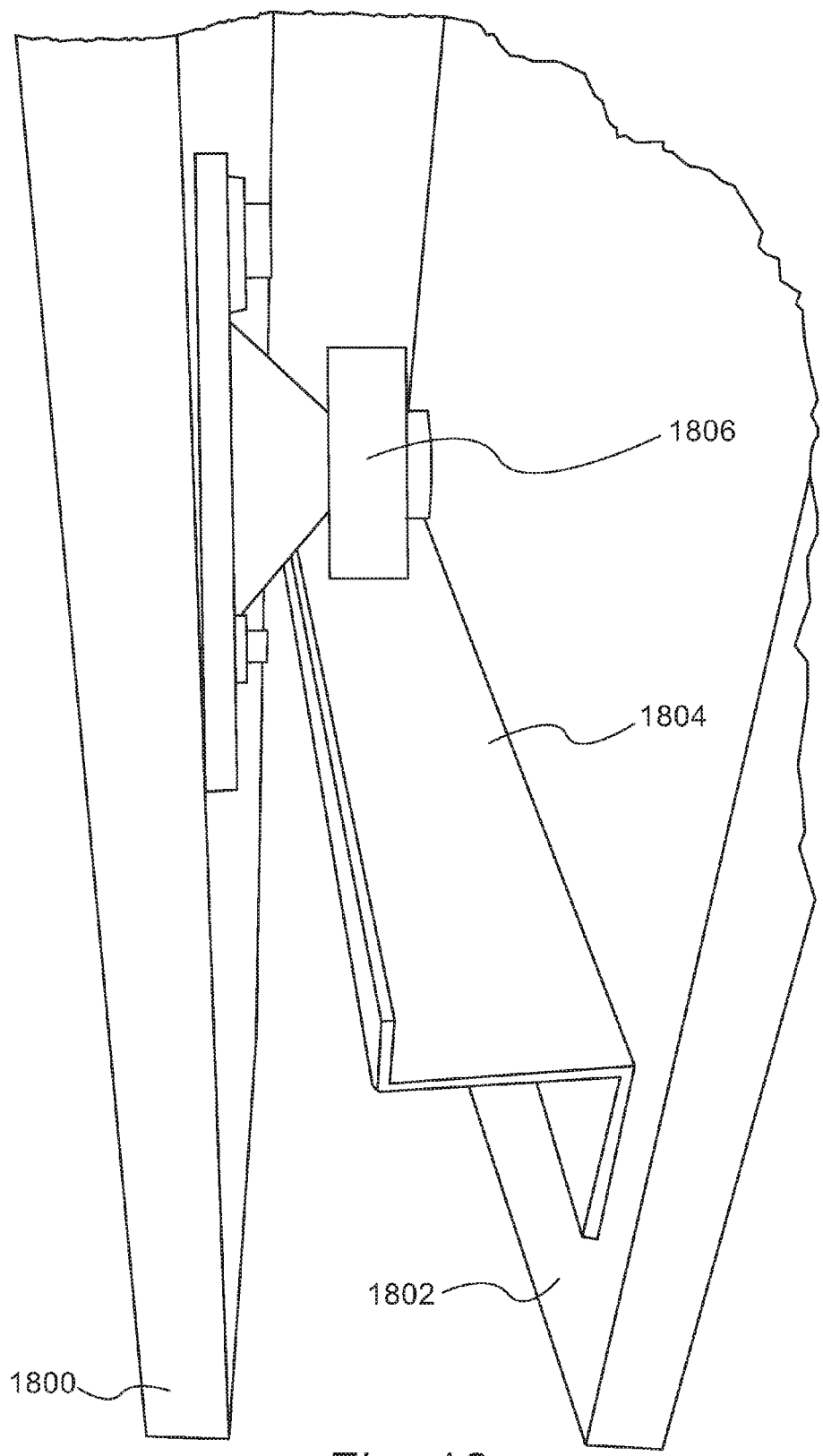
FIG. 18 represents a photograph of a movable wall, in accordance with some demonstrative embodiments.

According to some embodiments, the connecting elements may include at least one stationary element and at least one movement-facilitating element, e.g., as demonstrated in FIG. 18. For example, the movable wall may include at least one movement-facilitating element and the stationary wall may include at least one stationary element.

According to this example, the movement-facilitating element may be positioned on top of the stationary element, for example, to enable the movement of the movable wall across the stationary element.

In some demonstrative embodiments, the movement-facilitating element may include any suitable means to enable mobility, including, for example, wheels, hinges and the like.

According to some demonstrative embodiments, the stationary element may include any suitable item and/or element securely attached to a wall which may be capable of supporting and/or enabling the movement of one or more of the movement-facilitating elements connected thereto. For example, the stationary element may include an elongated metal bar, for example, having the shape of the letter L, e.g., performing the action of a track, e.g., as demonstrated in FIG. 18.

According to some embodiments, one or more of the movement-facilitating elements may be positioned onto the stationary element, for example to enable to movement of the movable wall, e.g., as demonstrated in FIG. 18.

Figure 19:
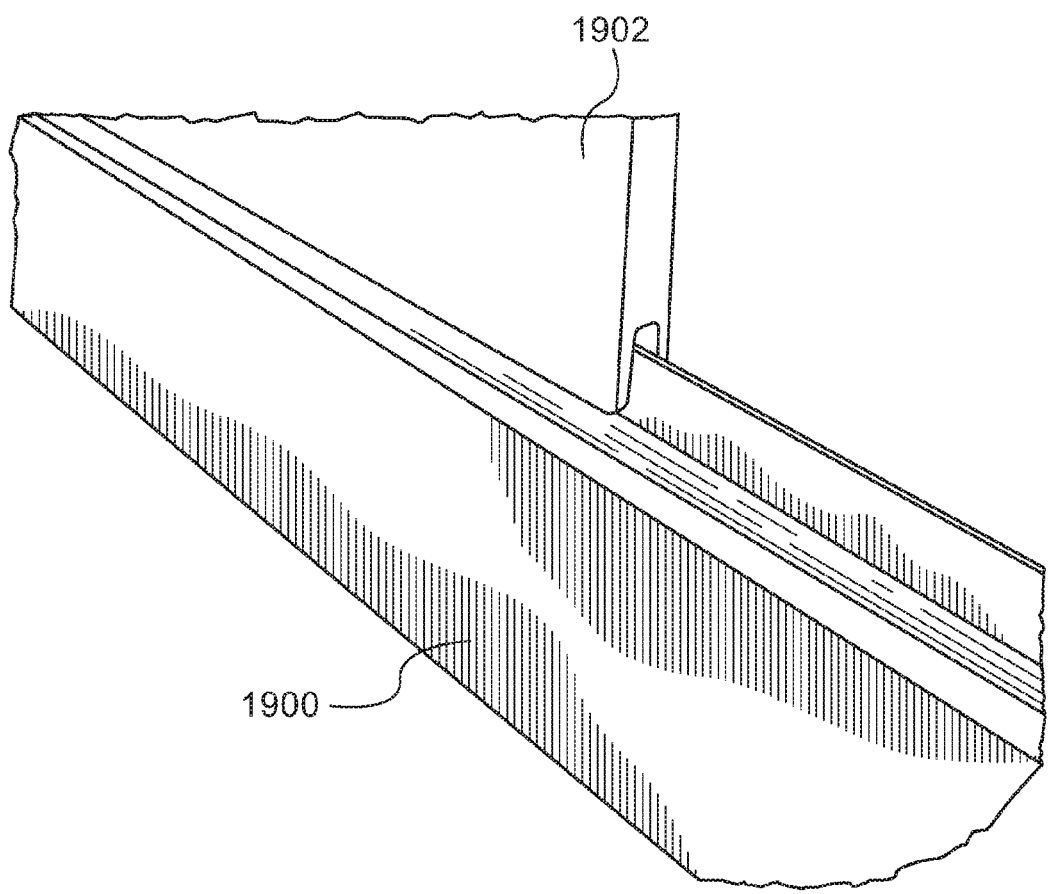
FIG. 19 represents a photograph of a stabilizing element, in accordance with some demonstrative embodiments.

In some demonstrative embodiments, the movable wall may be positioned in relation to one or more stabilizing elements, for example, to provide support for the movable wall, e.g., as demonstrated in FIG. 19.

According to some embodiments, the one or more stabilizing elements may include one or more structures performing the action of a track, for example, wherein the movable wall may be positioned onto one or more tracks to stabilize the movable wall.

According to some embodiments, the movable wall may be conveyed along the one or more tracks.

Reference is now made to FIG. 18, which represents a photograph of a movable wall 1800, in accordance with some demonstrative embodiments.

In some demonstrative embodiments, movable wall 1800 may include at least one movement-facilitating element, e.g., a wheel 1806.

According to some embodiments, movable wall 1800 may be connected to a stationary wall 1802, e.g., as described in detail below.

In some demonstrative embodiments, stationary wall 1802 may include a track 1804, configured to carry movable wall 1800, e.g., via wheel 1806.

For example, wheel 1806 of movable wall 1800 may be placed on top of track 1804 of stationary wall 1802 to enable a "right to left" and "left to right" movement of movable wall 1800 along track 1804.

Reference is now made to FIG. 19, which represents a photograph of a stabilizing element 1900, in accordance with some demonstrative embodiments.

In some demonstrative embodiments, a movable wall 1902 may be positioned onto stabilizing element 1900 to provide support for movable wall 1902.

According to some embodiments, movable wall 1902 may include one or more end parts to positioned onto one or more stabilizing elements 1900. For example movable wall 1902 may include a first top end part to be positioned onto a first stabilizing element 1900, e.g., attached to a ceiling; and/or movable wall 1902 may include a second bottom end part to be positioned onto a second stabilizing element 1900, e.g., attached to a floor and/or ground.

According to some demonstrative embodiments, upon positioning of movable wall 1902 onto stabilizing element 1900, stabilizing element 1900 may be attached to the stationary wall. For example, the second bottom end part of movable wall 1902 may be positioned onto stabilizing element 1900 attached to a bottom part of the stationary wall.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A reinforced gypsum board comprising:
a first external sheet;
a second external sheet;
a layer of gypsum plaster sandwiched between the first external sheet and the second external sheet; and
at least one reinforcing sheet entirely embedded within said layer of gypsum plaster between the first and second external sheets,
wherein an internal surface of the first external sheet is entirely in contact with said gypsum plaster, an internal surface of the second external sheet is entirely in contact with said gypsum plaster, and said reinforcing sheet is substantially parallel to said first and second external sheets.

2. The reinforced gypsum board of claim 1, wherein at least first and second opposite surfaces of said reinforcing sheet are entirely in contact with said gypsum plaster.

3. The reinforced gypsum board of claim 1, wherein the internal surface of the first external sheet is parallel to the internal surface of the second external sheet.

4. The reinforced gypsum board of claim 1, wherein said reinforcing sheet is configured to be able to retain a fastener to be inserted into said reinforcing sheet through said layer of gypsum plaster.

5. The reinforced gypsum board of claim 1, wherein said reinforcing sheet runs along substantially an entire length of said gypsum board.

6. The reinforced gypsum board of claim 1, wherein said reinforcing sheet runs along substantially an entire cross-section area of said layer of gypsum plaster.

7. The reinforced gypsum board of claim 1, wherein said reinforcing sheet comprises Aluminum.

8. The reinforced gypsum board of claim 1, wherein said reinforcing sheet comprises Iron, steel or copper.

9. The reinforced gypsum board of claim 1, wherein said reinforcing sheet comprises plastic.

10. The reinforced gypsum board of claim 1, wherein said reinforcing sheet comprises wood or Medium-density fibreboard (MDF).

11. The reinforced gypsum board of claim 1, wherein said reinforcing sheet comprises a rigid material.

12. The reinforced gypsum board of claim 1, wherein said reinforcing sheet comprises a semi-rigid material.

13. The reinforced gypsum board of claim 1, wherein said at least one reinforcing sheet comprises a plurality of reinforcing sheets.

14. The reinforced gypsum board of claim 1 having a thickness of no more than 25 millimeters.

15. The reinforced gypsum board of claim 1 having a thickness of no more than 12.5 millimeters.

16. The reinforced gypsum board of claim 1, wherein at least one of the first external sheet or the second external sheet comprises a paper material.

17. The reinforced gypsum board of claim 1 comprising a rectangular board, said reinforcing sheet comprising a rectangular sheet.

* * * * *